A. HARCUM.
Ornamenting Glassware.

No. 196,663. Patented Oct. 30, 1877.

Witnesses
John K. Smith
Frank M. Reese

Inventor
Andrew Harcum
by Bakewell & Kerr
Attys

UNITED STATES PATENT OFFICE.

ANDREW HARCUM, OF SCOTT TOWNSHIP, ALLEGHENY COUNTY, PA.

IMPROVEMENT IN ORNAMENTING GLASSWARE.

Specification forming part of Letters Patent No. 196,663, dated October 30, 1877; application filed September 21, 1877.

*To all whom it may concern:*

Be it known that I, ANDREW HARCUM, of Scott township, in the county of Allegheny and State of Pennsylvania, have invented a new and useful Improvement in Ornamenting Glassware; and I do hereby declare the following to be a full, clear, and exact description thereof, reference being had to the accompanying drawings, forming part of this specification, in which—

Figure 1:
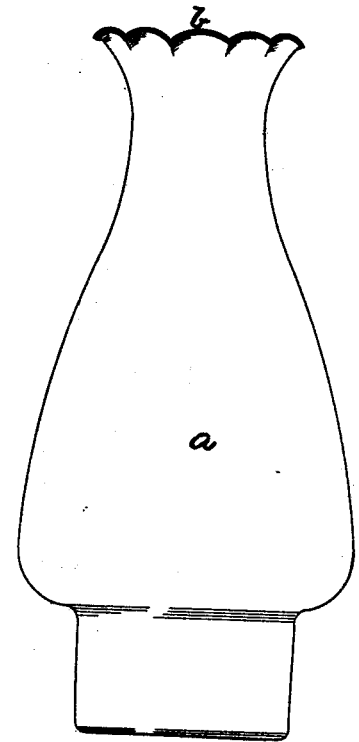
Figure 2:
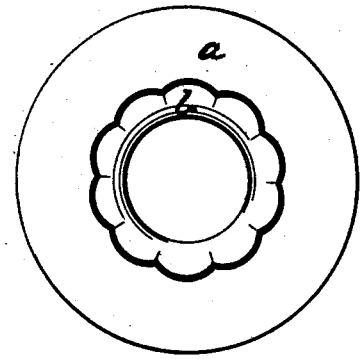

Figure 1 is a side view, and Fig. 2 a top view, of a flared and crimped chimney, illustrating one application of my invention.

Like letters refer to like parts wherever they occur.

My invention relates to the ornamentation of articles of glassware, such as lamp-chimneys, smoke-bells, and other hollow articles, either adapted to be or that are at present finished by what is termed "tipping," and is especially applicable to articles requiring to be finished in the glory-hole.

Heretofore the manner of tipping articles of the class specified has been to gather a small portion of molten glass of the required color upon a rod, and, when the article to be tipped or finished has been formed and reheated, to apply the tipping material in the molten condition, and subsequently reheat and fire-polish the article.

Such a procedure requires skilled labor, an additional hand to attend to the colored glass, involves loss of time, and necessitates careful manipulation.

The object of my invention is to simplify the method of tipping, so that it can be done by boys or unskilled labor, without loss of time, and with uniform results; to which end I apply the tipping glass in a powdered condition to the article to be ornamented, and which has been reheated, so that the powdered material will stick thereto.

I will now proceed to describe my invention, so that others skilled in the art to which it appertains may apply the same.

I take glass of any color with which it is desired to tip or finish the article, and pulverize it, by pounding it, by grinding, or otherwise, until it is very finely and evenly divided, after which it is spread or shaken in a thin uniform layer upon a flat surface to a depth proportionate to the width of band or finish desired.

The chimney, Figs. 1 and 2, *a*, smoke-bell, vase, bowl, or other article to be tipped, is first made and formed in the usual or any approved manner. The portion to be tipped or ornamented is then reheated in the finishing-furnace, and dipped into the pulverized glass until sufficient thereof adheres to the article to give the desired result, after which it is again inserted in the hole of the finishing-furnace, so as to burn or melt the colored glass which has adhered to the glass of which the article is formed, after which the article can be completed in any of the well-known ways.

In the instance chosen for illustration, a chimney, *a*, has been blown and shaped, the end *b* reheated in the glory-hole, and dipped by the boy in pulverized glass, then reheated, and subsequently flared and crimped, all of which occupied scarcely more time than is required to form a similar article without tipping it.

The advantages of my invention are, that it reduces the cost of tipping, does away with skilled labor, and saves time.

By the old method from one hundred to one hundred and fifty chimneys may possibly be made and tipped in a turn of five and a half hours, while by my method the usual turns work of from two hundred and fifty to three hundred chimneys can be tipped.

Having thus described my invention, what I claim, and desire to secure by Letters Patent, is—

As an improvement in the method of ornamenting glass, applying the tipping glass in a pulverized condition to the heated article, and then reheating the same, substantially as specified.

In testimony whereof I, the said ANDREW HARCUM, have hereunto set my hand.

ANDREW HARCUM.

Witnesses:
JAMES I. KAY,
T. B. KERR.